Oct. 14, 1952           F. GREGSON           2,613,698
STUMP SAW ANGLING BEAM AND SELF-PROPELLING
AND STEERING ATTACHMENT
Filed Sept. 26, 1946           3 Sheets-Sheet 1
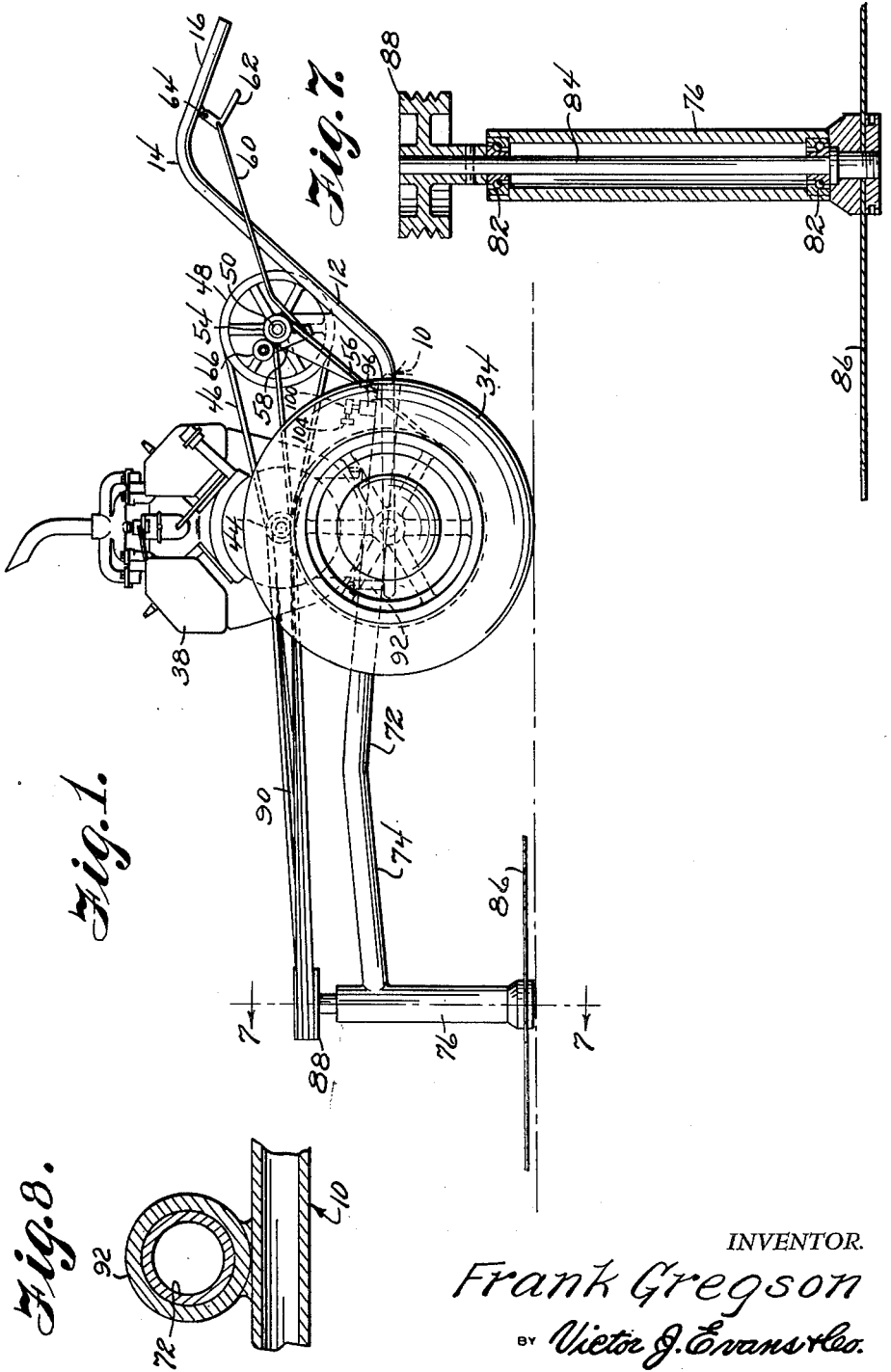
INVENTOR.
Frank Gregson
BY Victor J. Evans & Co.
ATTORNEYS

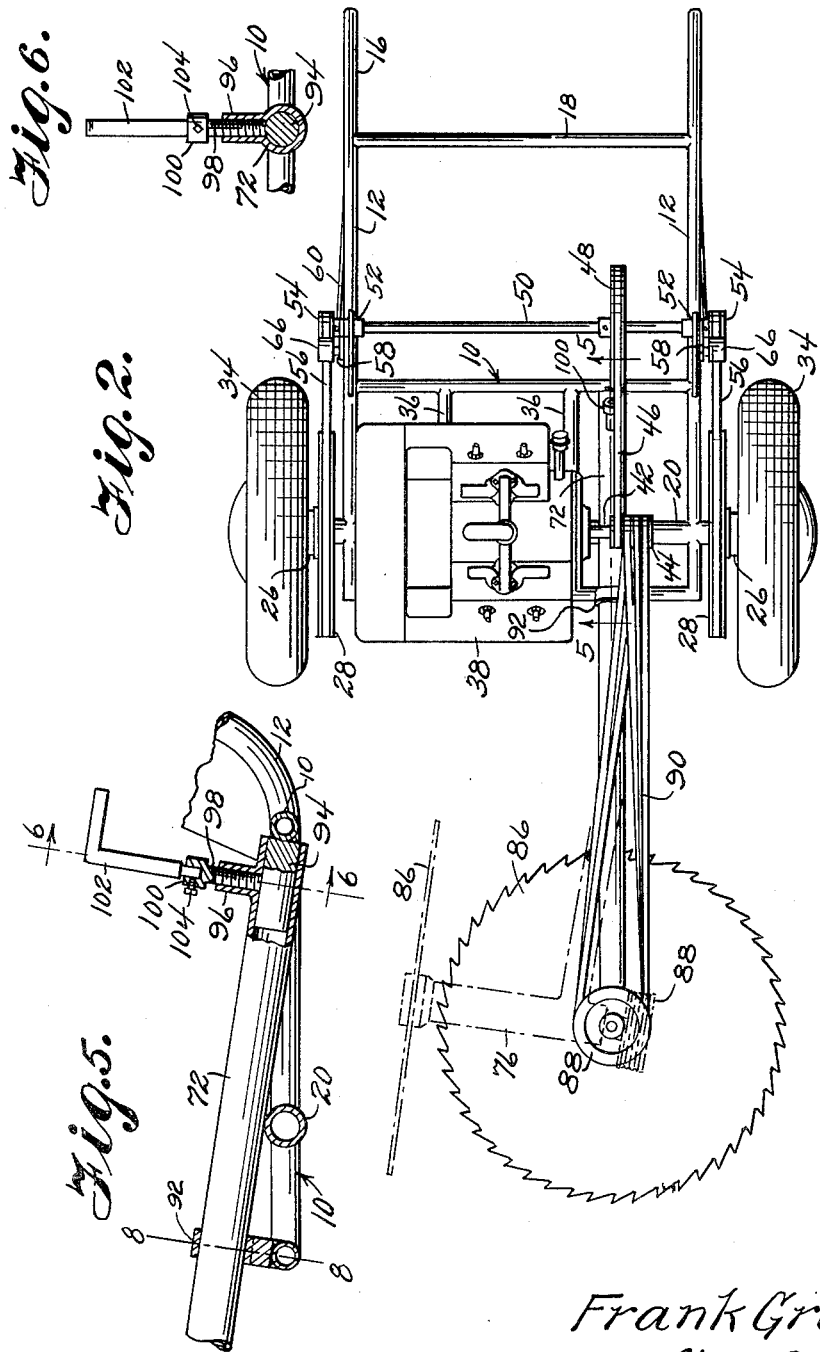

Oct. 14, 1952    F. GREGSON    2,613,698
STUMP SAW ANGLING BEAM AND SELF-PROPELLING
AND STEERING ATTACHMENT
Filed Sept. 26, 1946    3 Sheets-Sheet 3
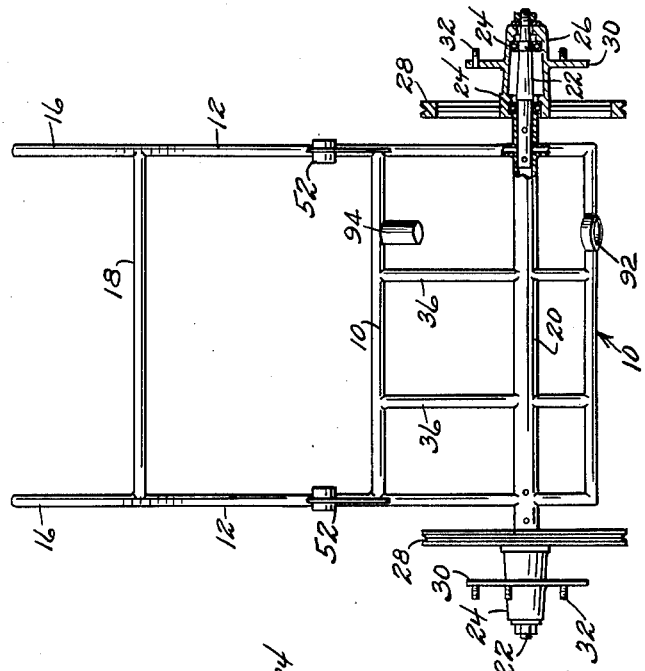
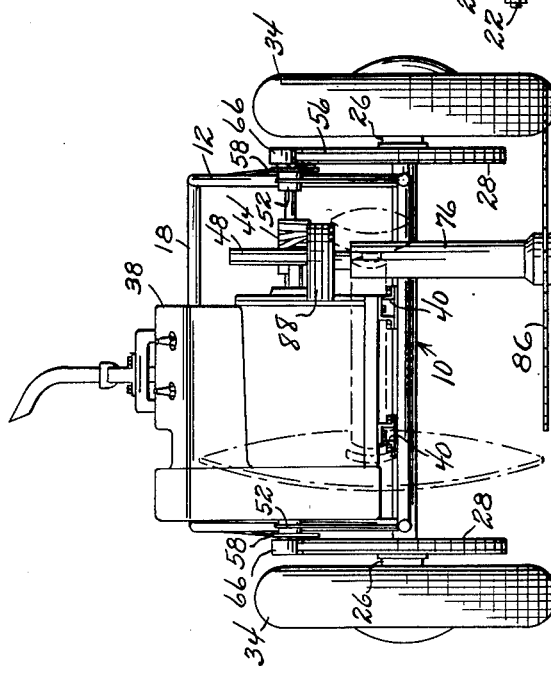
INVENTOR.
Frank Gregson
BY Victor J. Evans & Co.
ATTORNEYS

UNITED STATES PATENT OFFICE 2,613,698

STUMP SAW ANGLING BEAM AND SELF-PROPELLING AND STEERING ATTACHMENT

Frank Gregson, Jonesboro, Ark.

Application September 26, 1946, Serial No. 699,388

1 Claim. (Cl. 143—43)

This invention relates to an attachment for a stump saw, comprising an angling beam and self-propelling steering arrangement therefor.

An object of this invention is to provide a portable stump sawing apparatus that is particularly designed to cut stumps at a level with the ground in which they are growing.

Another object of this invention is to provide a portable stump sawing apparatus that, provided with a self-angling beam, is efficient in operation, durable in use and constructed of a few simple parts, will easily perform the purpose for which it is designed.

With the above and other objects and advantages in view, the invention consists of the novel details of construction, arrangement and combination of parts more fully hereinafter described, claimed and illustrated in the accompanying drawings in which:

Figure 1 is a side elevation of an embodiment of the invention;

Figure 2 is a top plan view thereof;

Figure 3 is a front elevational view thereof;

Figure 4 is a plan view of the frame of the apparatus;

Figure 5 is a sectional view on the line 5—5 of Figure 2;

Figure 6 is a sectional view on the line 6—6 of Figure 5;

Figure 7 (sheet 1) is a sectional view on the line 7—7 of Figure 1 and

Figure 8 is a sectional view on the line 8—8 of Fig. 5.

Referring more in detail to the drawings, the stump sawing apparatus comprises the frame 10, having rearwardly extending, upwardly inclined parallel handle bars 12 bent downwardly at 14 to form the inclined grip portion 16, and the transverse bridging brace bar 18 is secured to the handle at the bend 14.

Extending transversely of the frame 10 is the axle housing 20 in which are mounted at opposite ends in any conventional manner, the stub axles 22 on which is mounted by means of bearings 24 the hub 26 having a V-pulley 28 formed at the inner end thereof and a circular plate 30 having lugs 32 for attaching a rubber-tired wheel 34 thereto. Longitudinal parallel brace bars 36 are connected to the frame 10, and housing 20 for the strengthening thereof, and to a base on which the gasoline engine 38 is mounted by means of brackets 40.

The drive shaft 42 of the engine 38 is provided with a multiple pulley 44 having a belt drive connection 46 with a pulley 48 mounted on a shaft 50 journalled transversely of the handle bars 12 in the bearings 52 and pulleys 54 on the opposite ends of shaft 50 having belt drive connections 56 with the pulleys 28 on the hubs 26. The belts 50 will apply power to the wheels 34 by means of the belt tighteners 58 pivotally mounted on the shaft 50 and manipulated by control rods 60 pivotally connected to the hand grips 62 pivotally mounted at 64 on the grip portions 16 of the handle bars 12 and pulleys 66 on the tighteners 58 will tighten the belts 50 when the grips 62 are firmly grasped to apply power to the wheels 34 for the moving of the apparatus as desired.

A cylindrical projection 94 secured to the frame 10 mounts the forwardly extending beam 72 having the downwardly inclined forward portion 74 on which is provided the vertical tubular housing 76, and the beam is retained in fixed relation to the frame 10 by the set screw 98 in the threaded projection 96.

Mounted in the housing 76 by bearings 82 is the shaft 84 having the circular saw 86 secured thereto at its lower end, and the multiple V-pulley 88 secured thereto at its upper end and the pulley 88 has belt drive connections 90 with the pulley 44 on the drive shaft 42.

The internally threaded projection 96 on the beam 72 receives the locking screw 98 having a socket 100 on the upper end thereof to receive the handle 102 and a set screw 104 retains the handle in the socket. Thus by loosening the screw 98, the beam 72 can be moved by means of the handle 102.

During operation of the apparatus, the grips 62 can be manipulated to drive the apparatus in a forward direction, but by grasping only one of the grips, the apparatus may be steered either to the right or left in moving the apparatus to the stump to be cut.

The grips can then be used to swing the beam in either direction to bring the saw into engagement with the stump, and the stump can be sawed in the conventional manner.

Since the beam is rotatable on the frame 10 as described, the housing 76 can be swung in an arc to position the saw for cutting at an angle to the ground or in vertical relation, which thus permits the apparatus to be used for other sawing operations than just stump cutting.

It is believed that from the foregoing description the operation and construction of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a wheeled frame, handles on said frame, a gasoline motor on said frame, drive connections from the motor to the wheels of said frame, manually operated means controlling said drive connection for the steering of said frame, by selectively engaging the drive connections to cause rotation of either of said wheels, a forwardly extending hollow beam on said frame, a housing at the end of said beam, an axle in said housing, a pulley on the top of said axle, belt drive connections from said pulley to said motor, a circular saw on the bottom of said axle, and means carried by said frame for rotating said beam to position said housing at an angle to the ground said means comprising a projection carried by the frame adapted to rotatably enter into and receive said beam, an internally threaded projection on the beam at right angles to said first projection, a locking screw carried by the projection on the beam and engaging said first projection to retain said beam and first projection in fixed relation to each other and a handle member engageable with the locking screw to rotate said beam after said screw has been loosened.

FRANK GREGSON.

REFERENCES CITED

The following references are of record in the file of this patent:

UNITED STATES PATENTS

| Number | Name | Date |
|---|---|---|
| 1,454,901 | McArthur | May 15, 1923 |
| 1,891,526 | Dupuis | Dec. 20, 1932 |
| 2,353,873 | Brownlee | July 18, 1944 |
| 2,407,028 | McLean | Sept. 3, 1946 |
| 2,412,705 | Jaques | Dec. 17, 1946 |
| 2,429,378 | Stuebner | Oct. 21, 1947 |
| 2,435,192 | Arsneau | Feb. 3, 1948 |
| 2,461,188 | Stoner | Feb. 8, 1949 |

FOREIGN PATENTS

| Number | Country | Date |
|---|---|---|
| 115,111 | Australia | May 6, 1942 |
| 118,817 | Australia | Aug. 14, 1944 |